United States Patent Office 3,432,565
Patented Mar. 11, 1969

3,432,565
PROCESS FOR THE HYDROGENATION OF UNSATURATED HYDROCARBONS
Herman W. Kouwenhoven and Cornelis Th. Douwes, Amsterdam, Netherlands, assignors to Shell Oil Company, New York, N.Y., a corporation of Delaware
No Drawing. Filed May 11, 1966, Ser. No. 549,179
Claims priority, application Netherlands, June 1, 1965, 6506907
U.S. Cl. 260—667                7 Claims
Int. Cl. C07c 5/10, 5/14; C10g 23/02

ABSTRACT OF THE DISCLOSURE

Process to hydrogenate unsaturated hydrocarbons using one or more Group VIII metals supported on low bulk density alumina.

This invention relates to a process for the hydrogenation of unsaturated hydrocarbons under the influence of a catalyst comprising one or more Group VIII metals supported on a carrier entirely or substantially alumina.

Processes of this type are already known from the literature and usually give satisfactory results. In general, a larger amount of catalytically active metal tends to provide a more active catalyst.

Noble metals are quite costly and although they are supported on a relatively cheap carrier material, the cost price of the catalyst as a whole usually is substantially determined by its metal content. With other metals, e.g., nickel, rather large amounts of the metal is used so again the catalyst cost is quite high. Therefore, there has been considerable attempt to reduce the metal content as much as possible while maintaining catalyst activity.

It has been found, however, that the nature of the carrier material influences the overall quality of the catalyst and that in particular the bulk density of the carrier material plays an important role. By selecting an alumina carrier of low bulk density, smaller amounts of active hydrogenation metal component can be used. The present invention therefore, is a process for the hydrogenation of unsaturated hydrocarbons under the influence of a catalyst containing one or more metals of Group VIII supported on a carrier having a bulk density lower than 0.78 g./ml. and which entirely or substantially comprises alumina.

Although preference is given to alumina, this term should hereinafter be taken to include, unless expressly specified otherwise, carriers substantially consisting of alumina but which in addition contain smaller quantities (e.g., 0.01–10% w.) of other oxides, such as magnesia, zinc oxide, silica and alkali.

Alumina having a bulk density lower than 0.75 g./ml., or even lower than 0.70 g./ml., is preferred. In particular, alumina having a bulk density lower than 0.65 g./ml., such as, for instance, alumina with a bulk density of 0.63 g./ml., gives excellent results. Obviously, for practical reasons, the bulk density should be of a minimum value in order to impart a certain necessary mechanical strength to the carrier. This minimum value, below which the bulk density must not drop, can be determined for each individual case in a simple way by those skilled in the art. Naturally, this minimum value will depend on, for example, the type conversion desired and the reaction conditions applied. However, as a general rule, bulk densities in the order of magnitude of from 0.40 to 0.50 g./ml. are still permissible in the vast majority of cases.

The hydrogenation proceeds most satisfactorily with molecular hydrogen which in the gaseous state is in contact with the compounds to be hydrogenated or in the dissolved state is present in the starting material to be hydrogenated.

The unsaturated hydrocarbon which can be hydrogenated by the process of the invention can be aromatic as well as aliphatic, branched or unbranched and may contain, if desired, substituent groups which do not hamper the hydrogenation. In this connection the term hydrocarbons should be taken to include also heterocyclic aromatics and polynuclear aromatics of which one or more nuclei are heterocyclic. The compounds to be hydrogenated can be treated alone or in combination with other compounds or also, if desired, in the form of mixtures with inert compounds. An example of such mixtures are petroleum fractions, such as petroleum distillates, among which in particular are the aromatic-containing distillates, such as aromatic-containing kerosenes.

The active metal hydrogenation component is a metal of Group VIII of the Periodic System of Elements, namely, osmium, iridium, platinum, palladium, ruthenium, rhodium, iron, cobalt and nickel. Special preference is given to platinum, although palladium and nickel also yield good results. Obviously, combinations of the aforementioned metals can also be applied.

The quantity in which this metal, or these metals, is, or are, supported on the carrier may vary within very wide limits. As a rule, this quantity is between 0.1 and 10% w., in particular between 0.3 and 3% w., such as, for instance, between 0.5 and 1.3% w., calculated on the amount of carrier material.

The alumina used as carrier in the process according to the invention can in principle be any alumina meeting the aforementioned requirements with regard to bulk density. However, special preference is given to alumina containing less than 0.6% w. of alkali metal. In particular, alumina whose alkali metal content is below 0.4% w. yields very favorable results.

Although the catalysts in the present process have a rather long life, 2,000 hours or even longer, without activity declining appreciable, in particular the Pt- and Pd-containing catalysts, they may be reactivated or regenerated in a simple manner if they have entirely or substantially lost their activity after a prolonged period of operation.

Catalyst activity may decline in the long run as a result of contaminants in the feed, such as for instance, slight quantities of sulfur, by carbon deposition, etc. The catalyst can then be reactivated or regenerated in a simple way by burning off carbon or other material, after which the catalyst can be used again for a very long time. This burning off can be effected in a known manner, a maximum temperature of from about 550 to 600° C. usually being observed.

As already stated, the process according to the invention is very suitable for the hydrogenation of specific petroleum fractions, for example, for the preparation of petroleum distillate fractions as fuels having an improved smoke point. For petroleum fractions wherein full consideration is given to the burning properties, such as lamp kerosene and kerosene for jet engines, these properties may amongst other things be characterized by the smoke point, i.e., the height in mm. of a flame just before it becomes smoky. This smoke point is known to be dependent as a rule on the aromatics content of the petroleum fraction. It is also known that the aromatics content can be reduced and consequently the smoke point raised by hydrogenation in which aromatics are converted into naphthenes.

The term distillate in this specification is to be taken as a petroleum distillate fraction with a boiling range between about 100 and 350° C., e.g., a kerosene fraction boiling in the range between about 165 and 260° C.

As the catalysts of the type used in the present process are as a rule poisoned by S, H₂S or other S-containing compounds, it is preferred that sulfur-free or substantially sulfur-free feeds, preferably containing less than about 10 p.p.m. of sulfur, be employed as the starting materials.

When the aforementioned distillates are hydrogenated and they are not entirely or substantially sulfur-free as a result of the composition of the crude oil or petroleum fraction from which they have been obtained, it is advantageous to subject them first to a desulfurizing treatment, many of which are well known for this purpose.

Desulfurization of the feed usually is effected catalytically in the presence of hydrogen. For instance, desulfurization may be carried out in the gas phase or in the liquid phase with gas recycle, such as, for example, in the trickle process, in which a very thin film of feed flows over a catalyst bed. The trickle technique, which is very suitable, has been described, for instance, in British Patent No. 657,521.

In the desulfurization reaction, the sulfur compounds present are partly converted into hydrocarbon and hydrogen sulfide. The conditions are chosen so that the sulfur content of the feed drops to the desired level, for example, to 10 p.b.w. of sulfur per million p.b.w. of feed (10 p.p.m. w.) and preferably to 5 p.p.m. or less.

Suitable catalysts for this desulfurization are compounds of metals and oxygen or sulfur, such as oxides and sulfides, of metals of the sixth and eighth groups of the Periodic System. Preference is given to a catalyst which contains both a metal of the sixth group or a compound of this metal and a metal of the eighth group of the Periodic System or a compound of this metal. They can be supported on a carrier, such as activated carbon, fuller's earth, kieselguhr, silica or alumina, for instance, alumina in the form of bauxite or sintered clay. Preference is given to a carrier consisting, at least substantially, of alumina.

Special preference is given to catalysts which are insensitive to hydrogen sulfide, such as cobalt compounds and molybdenum compounds together on alumina as carrier, nickel compounds and molybdenum compounds together on alumina as carrier, and tungsten sulfide and nickel sulfide together on alumina as carrier.

The desulfurization can be effected at operating conditions which may vary within wide limits. For example, a pressure of from 20 to 80 kg./cm.² abs. and preferably from 35 to 60 kg./cm.² abs. is very suitable. Suitable temperature is in the range from 275° to 400° C., and preferably from 350 to 400° C. Space velocity is in the range from 0.5 to 12, and preferably 1 to 3 barrels of oil per barrel of catalyst per hour. The hydrogen/hydrocarbon ratio may be varied between, for instance, 50 and 1300 standard cubic feet of hydrogen per barrel of feed, but quantities above and below this range are also suitable. Pure hydrogen or hydrogen-containing mixtures, such as for instance, platformer gas can be used. As a rule mixtures with a hydrogen content of 40% or more are preferably used.

Obviously, it is also possible to effect the desulfurization in several steps, for instance by carrying out a first light, desulfurization followed by a second, deep, desulfurization, a technique which itself may offer advantages and which has been described, for example, in Belgian Patent No. 652,872.

In the present hydrogenation invention it is possible to alternate the use of a desulfurized or low sulfur feed, such as kerosene, with that of similar sulfur-containing feeds which contain, for example, up to from 10 to 20 p.p.m. or even 50 p.p.m. of sulfur, without having any appreciable detrimental effect on the catalyst.

The hydrogenation of the present process can be carried out at a pressure varying within wide limits, for instance, a total pressure of from 20 to 90 kg./cm.² abs. At this pressure, a partial hydrogen pressure of 5 kg./cm.² may be sufficient, but as a rule is higher, for instance, from 10 to 50 kg./cm.². In hydrogenation with gas recycle, a reactor pressure of from 60 to 70 kg./cm.² is preferably applied. The hydrogenation can take place, for example, in the gas phase or in the liquid phase. Hydrogenation temperature is in the range between 100 and 350° C. with a temperature between 200 and 300° C. being preferred. Space velocity may vary within wide limits and is in the range from 0.5 to 10 barrels of oil per barrel of catalyst per hour. The gas feed ratio is generally from 125 to 15,000 standard cubic feet of hydrogen per barrel of feed per hour, but in general, and lower ratios are also suitable.

As a hydrogen source, pure hydrogen or hydrogen-containing mixtures, such as, for example, platformer gas can be used. As a rule, mixtures having a hydrogen content of 40% or higher are used. Naturally, for catalyst life, it is very desirable that such mixture should contain no hydrogen sulfide.

The hydrogenation may be carried out continuously, semi-continuously or batchwise.

When the hydrogenation by the present process is carried out to dearomatize a given starting material, mixtures containing fairly large amounts of aromatics or even pude or substantially pure aromatics may yield mixtures with low or very low aromatics contents. For example, streams containing 50 or 20% v. of aromatics can readily be converted into streams containing as little as 8 or 5 even 3% v. of less or aromatics.

In general, a stream obtained from the dearomatization step can be mixed, if desired, with a non-dearomatized stream, in a ratio determined by the smoke points of these two streams and the desired smoke point of the mixture.

The catalysts used in the present process can be prepared according to any known method. A mode of preparation which has proved very successful comprises impregnating the carrier with a solution of a metal compound or a metal complex. In particular this method provides excellent results for Pt and Pd. For example, very favorable results are obtained with a solution of platinum tetraaminohydroxide in water, the solution containing approximately 20 mg. of Pt per ml. The impregnation is carried out at 20° C. and is followed by drying for some hours at 120° C. and calcination in air for 3 hours at 500° C.

Example

Six experiments were carried out in which a given desulfurized kerosene was hydrogenated with gaseous hydrogen over a catalyst consisting of platinum supported on an alumina carrier. In two of these experiments (No. 1 and 2), the alumina had a bulk density of 0.83 and in the other experiments, alumina with a bulk density of 0.77 (No. 3 and 4) or 0.63 (No. 5 and 6) was used. The kerosene had the following properties:

Boiling range, determined according to ASTM
D–86 _____ ° C__ 173–255
Smoke point _____ mm.__ 26
Aromatics content (FIA method) __ percent v._ 17.5
Sulfur content _____ p.p.m. w.___ 2

The reaction was performed isothermally and continuously in a tubular reactor with an internal diameter of 3 cm. and a capacity of 250 cm.³, at a temperature of 300° C., a pressure of 50 atm. and a hydrogen gas supply of approximately 575 s.c.f. per barrel of feed. The space velocity was adjusted so that in all cases, an aromatics conversion of 92% could just be attained.

In all cases, the final product can be characterized as follows:

Boiling range, determined according to ASTM
D–86 _____ ° C__ 170–255
Smoke point _____ mm.__ 40
Aromatics content (FIA method) __ percent v.___ 1.5
Sulfur content _____ p.p.m. w__ <1

Further data on and results of these experiments are given in the table below.

| Experiment No. | Bulk density of alumina, g./ml. | Pt content on alumina, percent w. | Maximum space velocity to provide an aromatics conversion of 92%, kg./liter/hr. |
|---|---|---|---|
| 1 | 0.83 | 0.5 | 2 |
| 2 | 0.83 | 1.0 | 4½ |
| 3 | 0.77 | 0.55 | 3½ |
| 4 | 0.77 | 1.05 | 6 |
| 5 | 0.63 | 0.9 | 6 |
| 6 | 0.63 | 1.3 | 8 |

The above results clearly show that at approximately equal concentration of platinum, considerably higher maximum space velocities can be attained if aluminas having a low bulk density (or in other words, that at equal space velocity and conversion, a smaller total quantity of catalytic metal suffiices) are used.

We claim as our invention:

1. In a process for the hydrogenation of aromatic hydrocarbons at elevated temperature and hydrogen pressure with a catalyst consisting essentially of a Group VIII metal supported on a carrier, the improvement wherein said carrier is alumina having a bulk density less than 0.78 gram per milliliter.

2. The process according to claim 1 wherein the metal is a noble metal.

3. The process according to claim 1 wherein the catalyst comprises 0.3% to 3% by weight platinum on alumina having a bulk density less than 0.70 gram per milliliter.

4. The process according to claim 1 wherein the aromatic hydrocarbon is a petroleum distillate fraction boiling in the range from about 100° to 350° C.

5. The process according to claim 3 wherein the aromatic hydrocarbon is a kerosene fraction having less than about 10 p.p.m. w. sulfur.

6. The process according to claim 1 wherein the metal content of the catalyst is from 0.1% to 10% by weight.

7. The process according to claim 1 wherein the alkali metal content of the carrier is less than 0.6% by weight.

References Cited

UNITED STATES PATENTS

| 2,888,397 | 5/1959 | Burton | 208—143 |
| 2,965,564 | 12/1960 | Kirsheabaum | 208—143 |
| 3,352,636 | 11/1967 | Wilson | 252—463 |
| 3,353,910 | 11/1967 | Cornelius | 252—463 |
| 3,202,480 | 8/1965 | Nixon | 252—463 |
| 3,217,277 | 5/1967 | Cosgrove | 23—143 |

OTHER REFERENCES

J. W. Newsome.: Tech. Paper No. 10, Alumina Properties, Aluminum Co. of America, pp. 34, 47, 48, 52, 1960.

DELBERT E. GANTZ, Primary Examiner.

V. O'KEEFE, Assistant Examiner.

U.S. Cl. X.R.

208—143